United States Patent [19]

Oguchi

[11] Patent Number: 4,878,191

[45] Date of Patent: Oct. 31, 1989

[54] MULTIPLICATION CIRCUIT CAPABLE OF OPERATING AT A HIGH SPEED WITH A SMALL AMOUNT OF HARDWARE

[75] Inventor: Tetsuji Oguchi, Tokyo, Japan

[73] Assignee: NEC Corporation, Tokyo, Japan

[21] Appl. No.: 155,771

[22] Filed: Feb. 16, 1988

[30] Foreign Application Priority Data

Feb. 13, 1987 [JP]   Japan ................................. 62-31026

[51] Int. Cl.$^4$ ............................................. G06F 7/50
[52] U.S. Cl. .................................................... 364/759
[58] Field of Search ............................... 364/759, 760

[56] References Cited

U.S. PATENT DOCUMENTS

| | | | |
|---|---|---|---|
| 3,761,699 | 9/1973 | Sather | 364/759 |
| 4,228,518 | 10/1980 | Chamberlin | 364/759 |
| 4,685,077 | 8/1987 | Loo | 364/759 |
| 4,745,569 | 5/1988 | Yamaoka et al. | 364/759 |

OTHER PUBLICATIONS

Waser, "High-Speed Monolithic Multipliers for Real-Time Digital Signal Processing", *Computer*, Oct. 1978, pp. 19–28.
Gerberich et al, "Multiplier/Divider Hardware Design Accelerates Microprocessor Throughput", *Computer Design*, Jun. 1979, pp. 105–112.

*Primary Examiner*—David H. Malzahn
*Attorney, Agent, or Firm*—Sughrue, Mion, Zinn, Macpeak & Seas

[57] ABSTRACT

A multiplication circuit comprises a zero detector coupled to a multiplier register so as to generate a signal indicative of completion of the multiplication operation when all of predetermined bits of the multiplier register are zero. A right shifter is coupled to the multiplier register so as to shift the input data one bit rightwardly and to put "0" at its most significant bit. The right shifter rewrites the multiplier register with the shifted data having the MSB of "0". Further, a left shifter is coupled to a multiplicand register so as to shift the input data one bit leftwardly and to put "0" at its least significant bit. The left shifter rewrites the multiplicand register with the leftwardly shifted data having the LSB of "0". An adder is coupled to receive a content of a product register and a content of the multiplicand register and to rewrite the product register with the result of an addition between the content of the product register and the content of the multiplicand register when the LSB of the multiplier register is "1".

4 Claims, 3 Drawing Sheets

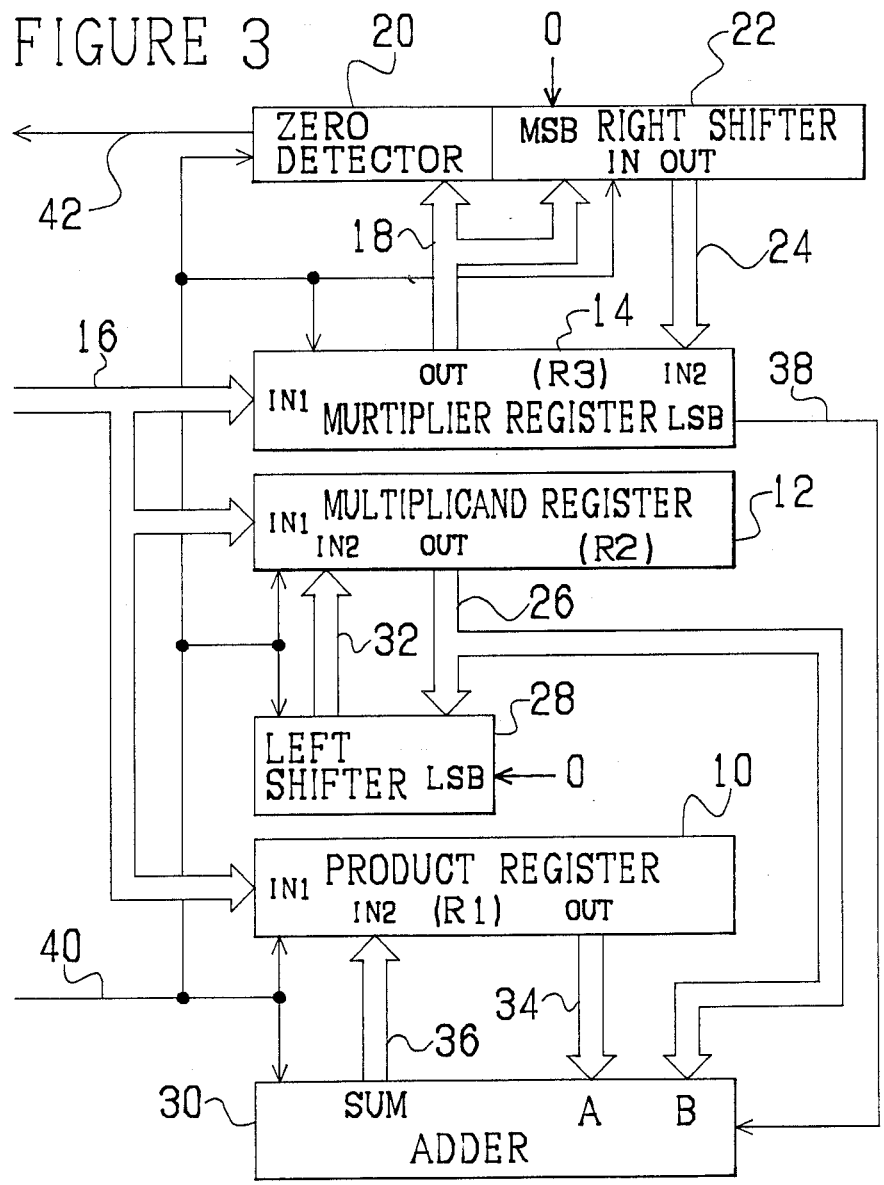

MULTIPLICATION CIRCUIT CAPABLE OF OPERATING AT A HIGH SPEED WITH A SMALL AMOUNT OF HARDWARE

BACKGROUND OF THE INVENTION

1. Field of the invention

The present invention relates to a multiplication circuit, and more particularly to a digital multiplication circuit for use in digital processors.

2. Description of related art

Heretofore, a multiplication has been executed by using either a general purpose processor operated in a programed manner or a single purpose multiplication circuit including a matrix of adders. In the case that the multiplication is executed by the general purpose processor, once a multiplicand is leftwardly shifted one bit, the shifted multiplicand is accumulatively added. The repetition time of the addition operations is defined by a multiplier. The conventional general purpose processor has needed a few program steps for each addition operation and therefore required a long time until one multiplication operation is completed. On the other hand, the single purpose multiplication circuit including a matrix of adders can execute a multiplication operation at a high speed but required a large amount of hardware. For example, the bit number of the adder depends upon the bit number of input and output data, and therefore, the larger the data length to be processed becomes, the larger the scale of the multiplication circuit becomes.

SUMMARY OF THE INVENTION

Accordingly, it is an object of the present invention to provide a multiplication circuit which has overcome the above mentioned defect of the conventional one.

Another object of the present invention is to provide a multiplication circuit capable of executing a multiplication operation with a decreased number of program steps and with a reduced execution time.

A further object of the present invention is to provide such a multiplication circuit capable of executing a multiplication operation at a reduced execution time, only with a small number of additional circuit elements.

The above and other objects of the present invention are achieved in accordance with the present invention by a multiplication circuit comprising:

a multiplier register coupled to receive an initial value of a multiplier before start of a multiplication operation;

a zero detector coupled to the multiplier register to generate a signal indicative of completion of the multiplication operation when all of predetermined bits of the multiplier register are zero;

a first shifter coupled to the multiplier register to receive the bits of the multiplier register so as to shift the input data, one bit in a direction from a more significant bit to a less significant bit, and to put "0" at its most significant bit, the first shifter rewriting the multiplier register with the shifted data having the most significant bit of "0";

a multiplicand register coupled to receive an initial value of a multiplicand before start of a multiplication operation;

a second shifter coupled to the multiplicand register to receive the bits of the multiplicand register so as to shift the input data, one bit in a direction from a less significant bit to a more significant bit, and to put "0" at its least significant bit, the second shifter rewriting the multiplicand register with the shifted data having the least significant bit of "0";

a product register coupled to receive an initial value of a product before start of a multiplication operation; and an adder coupled to receive a content of the product register and a content of the multiplicand register and responding to the least significant bit of the multiplier register so as to execute an addition between the content of the product register and the content of the multiplicand register when the least significant bit of the multiplier register is "1", the adder rewriting the product register with the result of the addition.

In the above mentioned multiplication circuit, the rewritings of the multiplier register, the multiplicand register and the product register are executed in parallel, and therefore, the addition operation based on each bit of the multiplier and the preparation of the data for a next addition operation can be simultaneously executed. Accordingly, the above multiplication circuit can execute a multiplication operation at a speed higher than the multiplication speed realized in the conventional general purpose processor The above and other objects, features and advantages of the present invention will be apparent from the following description of a preferred embodiment of the invention with reference to the accompanying drawings.

BRIEF DESCRIPTION OF THE DRAWINGS

FIG. 3 is a block diagram showing one embodiment of the multiplication circuit in accordance with the present invention.

DESCRIPTION OF THE PREFERRED EMBODIMENT

Figure 2:
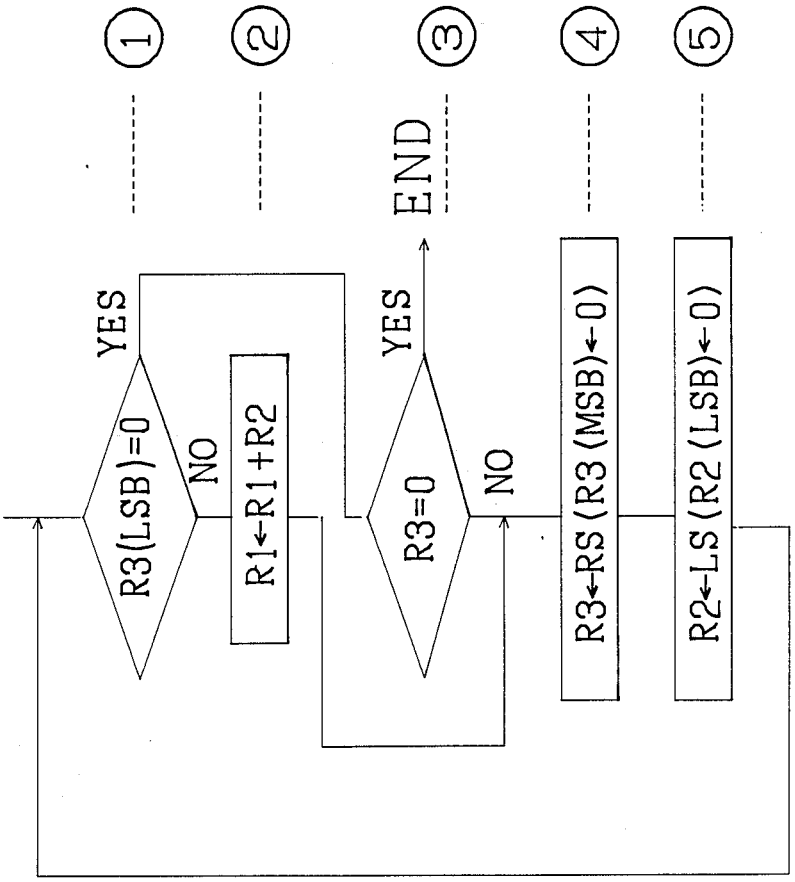
FIG. 2 is a flowchart illustrating one example of the multiplication operation in a conventional multiplication circuit.
Figure 1:
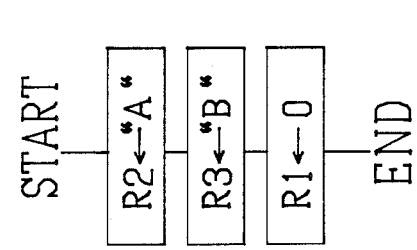
FIG. 1 is a flowchart illustrating an initialization of registers before execution of a multiplication operation.

For example, when a multiplication operation such as $A \times B = C$ is executed, A is called a multiplicand, and B and C are called a multiplier and a product, respectively. In the case that the multiplication is executed by using a general purpose processor, the multiplicand is repeatedly added by using an adder provided in the processor. More specifically, as shown in FIG. 1, prior to a start of a multiplication operation, an initial value "0" of the product, an initial value "A" of the multiplicand and an initial value "B" of the multiplier are set in three registers R1, R2 and R3 of the general purpose processor, respectively. Thereafter, a predetermined flow of operation steps as shown in FIG. 2 are repeatedly executed under control of the processor in accordance with a program set in the processor.

In a first step, it is discriminated whether or not a least significant bit (LSB) of the multiplier register R3 is zero. If the LSB is not zero, the contents of the product register R1 and the multiplicand register R2 are added and the product register R1 is rewritten with the result of the addition (step 2). Thus, the addition based on the LSB of the multiplier register R3 has been completed. Thereafter, data for a next addition is prepared in steps 4 and 5. In the step 4, the multiplier register R3 is rightwardly shifted one bit and the most significant bit (MSB) of the multiplier register R3 is written with zero. Further, in step 5, the multiplicand register R2 is leftwardly is shifted one bit and the least significant bit (LSB) of the multiplicand register R2 is written with zero. Thus, there has been prepared the data for the next addition and the operation is returned to the step 1.

In the step 1, if it is judged that the LSB is zero, it means that it is not necessary to add the content of the multiplicand register R2 at that time to the content of the product register R1. Therefore, whether or not all the bits of the multiplier register R3 are zero is judged (step 3). If all the bits of the multiplier register R3 are zero, the multiplication routine is terminated. If at least one bit of the multiplier register R3 is not zero, it means that it is necessary to further execute the multiplication operation, and so, the operation goes to the step 4.

The above operation is one typical example of the multiplication executed by using the general purpose processor. As seen from the above, since the general purpose processor has only instructions which can be used for various purposes, the processor requires a number of program steps for executing the multiplication operation. Even if the processor is speeded up so that each of the steps shown in FIG. 2 is executed with one clock, four clocks are required in carrying out the addition based on each bit of the multiplier "B". Namely, in the case that the general purpose processor is used, the multiplication operation cannot be sufficiently speeded up.

On the other hand, if there is used a single purpose multiplication circuit including a matrix of adders, a multiplication operation can be executed at a high speed, but the single purpose multiplication circuit requires a large amount of hardware and therefore is expensive. Particularly, since the bit number of the adder depends upon the bit number of input and output data, if the data length to be processed becomes long, the scale of the multiplication circuit also becomes large.

Turning FIG. 3, there is shown one embodiment of the multiplication circuit in accordance with the present invention, which comprises a product register R1 10, a multiplicand register R2 12 and a multiplier register R3 14 coupled at their first inputs IN1 to a data bus 16 so as to receive initial values from a processor (not shown), respectively. Respective bits of multiplier register R3 14 excluding the least significant bit (LSB) are coupled through a bus 18 to a zero detector 20 and a right shifter 22 in parallel. The zero detector 20 judges whether or not all the input bits are zero, and outputs a signal to the processor (not shown) when all the input bits are zero. The right shifter 22 operates to shift the input data one bit rightwardly, i.e., in a direction from a more significant bit to a less significant bit, and to put "0" at its most significant bit (MSB). The rightwardly shifted data having the MSB of "0" is outputted through a bus 24 to a second input IN2 of the multiplier register R3 14 so that the multiplier register R3 14 is rewritten with the rightwardly shifted data.

The multiplicand register R2 12 is coupled at its all bits through a bus 26 to a left shifter 28 and a B input of an adder 30. The left shifter 28 operates to shift the input data one bit leftwardly, i.e., in a direction from a less significant bit to a more significant bit, and to put "0" at its least significant bit (LSB). The thus leftwardly shifted data having the LSB of "0" is outputted through a bus 32 to a second input IN2 of the multiplicand register R2 12 so that the multiplicand register R2 12 is rewritten with the leftwardly shifted data.

The product register R1 10 is coupled at its all bits through a bus 34 to an A input of the adder 30. The adder 30 receives the LSB of the multiplier register R3 14 through a line 38. When the LSB of the multiplier register R3 14 is "1", the adder 30 executes the addition between the A input and the B input and outputs the result of the addition through a bus 36 to a second input IN2 of the product register R1 10 so that the product register R1 10 is rewritten with the result of addition. If the LSB of the multiplier register R3 14 is "0", the adder 30 will not execute the addition operation.

The above mentioned elements 10, 12, 14, 20, 22, 28 and 30 are controlled by a control signal or a clock signal supplied through a line 40 from the processor (not shown).

Now, description will be made on an operation of the above mentioned multiplication circuit.

Figure 4:
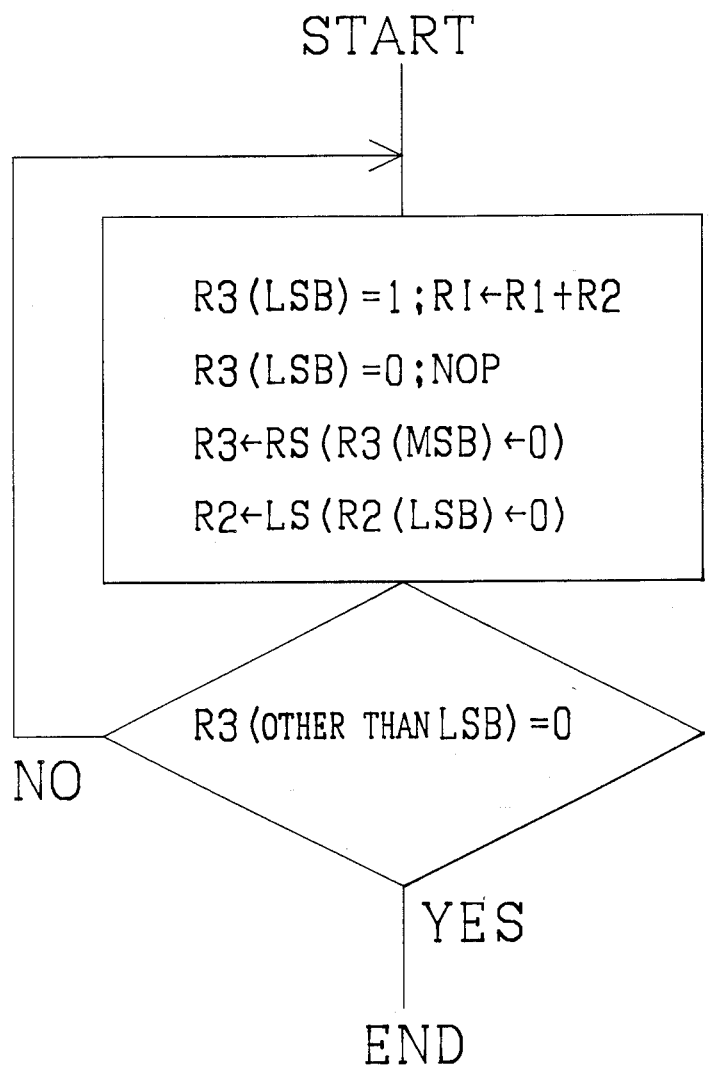
FIG. 4 is a flowchart illustrating one example of the multiplication operation in the multiplication circuit in accordance with the present invention.

First, an initial value "0" of the product, an initial value "A" of the multiplicand and an initial value "B" of the multiplier are set in the three registers R1 10, R2 12 and R3 14 prior to a start of a multiplication operation. Thereafter, the multiplication execution step as shown in FIG. 4 is started. The multiplication execution step as shown in FIG. 4 is completed at one clock but is repeated until it is judged that the multiplication operation has been completed, namely until the zero detector 20 detects that all the bits of the multiplier register R3 14 excluding the LSB are zero. When the zero detector 20 detects that all the bits of the multiplier register R3 14 excluding the LSB are zero, the zero detector 20 activates a line 42 connected to the processor (not shown) so as to notify the processor of the completion of the multiplication operation. On the other hand, processor watches the status of the line 42, and then determines whether or not it should go out of the multiplication execution operation.

Specifically, the following operations are carried out in one multiplication execution step as shown in FIG. 4.

For example, at a first half or a rising edge of each clock, the adder 30 responds to the least significant bit (LSB) of the multiplier register R3 14 so as to execute the addition between the contents of the product register R1 10 and the multiplicand register R2 12 if the LSB of the multiplier register R3 14 is "1". At a second half or a falling edge of each clock, the adder 30 outputs the result of the addition to the multiplier register R3 14 so that the content of the product register R1 10 is rewritten with the result of the addition. If the LSB of the multiplier register R3 14 is "0", the adder 30 does not operate and therefore, the content of the product register R1 10 is maintained as it is.

On the other hand, since the bits of the multiplier register R3 14 excluding the LSB are coupled to the right shifter 22, the right shifter 22 rightwardly shifts the input data one bit and puts "0" to the most significant bit (MSB) of the multiplier register R3 14 at a rising edge of each clock. Thereafter, at a falling edge of each clock, the right shifter 22 returns the rightwardly one bit shifted data having the MSB of "0" to the multiplier register R3 14 so as to rewrite the multiplier register R3 14 with the rightwardly shifted data.

Further, since the bits of the multiplicand register R2 12 are coupled to the left shifter 28, the left shifter 28 leftwardly shifts the input data one bit and puts "0" to the least significant bit (LSB) of the multiplicand register R2 12 at a rising edge of each clock. Thereafter, at a falling edge of each clock, the left shifter 28 returns the leftwardly one bit shifted data having the LSB of "0" to the multiplicand register R2 12 so as to rewrite the multiplicand register R2 12 with the leftwardly shifted data.

As seen from the above explanation, the shown embodiment of the multiplication circuit comprises the zero detector 20 and the right shifter 22 provided for the multiplier register R3 14 and the left shifter 32 provided for the multiplicand register R2 12 independently of the right shifter 20, and is so constructed that at the time the content of the multiplier register R3 14 is supplied to the zero detector 20 and the right shifter 22, the LSB of the multiplier register R3 14 is supplied to the adder 30 to cause the adder 30 to execute the addition operation between the contents of the product register R1 10 and the multiplicand register R2 12. Accordingly, those operations can be simultaneously executed, and therefore, the addition operation based on each bit of the multiplier can be executed one clock.

Thus, the multiplication circuit in accordance with the present invention can execute a multiplication operation at a speed higher than the multiplication speed realized in the general purpose processor, with a smaller scale of hardware than that required in the hardware multiplication circuit. In other words, the multiplication circuit of the present invention is capable of realize the multiplication speed four times as large as that of the conventional general purpose processor, with only using the adder having the same bit length as that of the multiplicand register and only adding two shifters and a zero detector which would not need a large scale.

The invention has thus been shown and described with reference to the specific embodiment. However, it should be noted that the present invention is in no way limited to the details of the illustrated structures but changes and modifications may be made within the scope of the appended claims.

I claim:

1. A multiplication circuit comprising:
    a multiplier register coupled to receive an initial value of a multiplier before start of a multiplication operation;
    a zero detector coupled to the multiplier register to generate a signal indicative of completion of the multiplication operation when all of predetermined bits of the multiplier register are zero;
    a first shifter coupled to the multiplier register to receive the bits of the multiplier register so as to shift the input data, one bit in a direction from a more significant bit to a less significant bit, and to put "0" at its most significant bit, the first shifter rewriting the multiplier register with the shifted data having the most significant bit of "0";
    a multiplicand register coupled to receive an initial value of a multiplicand before start of a multiplication operation;
    a second shifter coupled to the multiplicand register to receive the bits of the multiplicand register so as to shift the input data, one bit in a direction from a less significant bit to a more significant bit, and to put "0" at its least significant bit, the second shifter rewriting the multiplicand register with the shifted data having the least significant bit of "0";
    a product register coupled to receive an initial value of a product before start of a multiplication operation; and
    an adder coupled to receive a content of the product register and a content of the multiplicand register and responding to the least significant bit of the multiplier register so as to execute an addition between the content of the product register and the content of the multiplicand register when the least significant bit of the multiplier register is "1", the adder rewriting the product register with the result of the addition,
    whereby the rewritings of the multiplier register, the multiplicand register and the product register are executed in parallel.

2. A multiplication circuit as claimed in claim 1 wherein the multiplier register, the zero detector, the first shifter, the multiplicand register, the second shifter, the product register and the adder are connected to receive the same control signal, respectively, so that the respective rewritings of the multiplier register, the multiplicand register and the product register are concurrently executed.

3. A multiplication circuit as claimed in claim 1 wherein the multiplier register, the zero detector, the first shifter, the multiplicand register, the second shifter, the product register and the adder are connected to receive the same clock signal, respectively, so that the first shifter, the second shifter and the adder receive the respective data at a first half of each clock and output the treated data at a second half of each clock whereby the multiplier register, the multiplicand register and the product register are simultaneously rewritten at a second half of each clock.

4. A multiplication circuit as claimed in claim 1 further including a data bus coupled to the multiplier register, the multiplicand register and the product register, respectively for supplying the initial values of the multiplier, multiplicand and the product to the multiplier register, the multiplicand register and the product register, respectively, before the start of the multiplication operation.

* * * * *